United States Patent [19]

White

[11] 4,020,001
[45] Apr. 26, 1977

[54] DIOL CURATIVE FOR POLYURETHANE
[75] Inventor: John R. White, Wadsworth, Ohio
[73] Assignee: The Goodyear Tire & Rubber Company, Akron, Ohio
[22] Filed: Mar. 31, 1975
[21] Appl. No.: 563,434
[52] U.S. Cl. .................. 252/182; 260/2.5 AM; 260/2.5 AP; 260/2.5 AQ; 260/2.5 AZ; 260/77.5 AQ; 264/48
[51] Int. Cl.² .................. C09K 3/00; C08G 79/00
[58] Field of Search .............. 260/2.5 AM, 2.5 AP, 260/2.5 AZ, 2.5 AQ, 77.5 AQ; 252/182; 264/48

[56] References Cited
UNITED STATES PATENTS

| | | |
|---|---|---|
| 3,248,373 | 4/1966 | Barringer .................. 260/2.5 AM |
| 3,591,561 | 7/1971 | Kazama et al. ............. 260/2.5 AM |
| 3,595,814 | 7/1971 | Lloyd et al. ................ 260/2.5 AM |
| 3,630,973 | 12/1971 | Ardis ........................... 260/2.5 AM |
| 3,661,811 | 5/1972 | Hardy et al. ................ 260/2.5 AM |
| 3,664,976 | 5/1972 | Evans et al. ................ 260/2.5 AM |

Primary Examiner—Leland A. Sebastian
Attorney, Agent, or Firm—F. W. Brunner; J. D. Wolfe

[57] ABSTRACT

A polyol curative satisfactory for curing polyurethane reaction mixtures, said curative comprising ethylene glycol and a second diol selected from the class consisting of diethylene glycol, diisopropylene glycol, thio diethylene glycol and diethanol carbamate, ethanol isopropanol carbamate and ethanol diethanol carbamate.

2 Claims, No Drawings

DIOL CURATIVE FOR POLYURETHANE

This invention relates to improved diol curatives for liquid polyurethane reaction mixtures.

It has been known for many years that 1,4-butanediol gave exceptionally good effects when utilized to cure liquid polyurethane reaction mixtures and that the resulting polyurethanes were in general far superior to those obtained utilizing the other diols. Especially is this true in regard to those properties sensitive to temperature change.

In making self-skinning or integral skin polyurethane foam, it is desirable sometimes to use a low molecular weight, usually less than 500 molecular weight, polyol curative such as 1,4-butanediol or ethylene glycol in the one shot foam recipe. Unfortunately, when the polyol level approaches or exceeds 0.2 equivalents in the presence of the polyurethane catalyst of the tertiary amine or organic tin types, difficulty is experienced with delamination or peeling of the skin in places on the molded self-skin article. This delamination results in the article being rejected unless it can be repaired.

The object of this invention is to provide diol curatives which have the ability to cure liquid polyurethane reaction mixtures to give a polyurethane having physicals essentially as desirable as those obtained with 1,4-butanediol.

The above objects and advantages of this invention will be more readily seen from the following discussion and examples. In general, the benefits of this invention are obtained by using as the diol curative a blend of ethylene glycol with a second diol selected from the class consisting of the glycols of diethylene, diisopropylene and thio diethylene and the carbamates of diethanol, ethanol isopropanol and ethanol diethanol. The percentage of the second diol in the ethylene glycol blend is specific and necessary to get satisfactory high and low temperature properties. Generally, the second diol is used in the amounts of 10 to 35, and preferably 20 to 30 mole percent in the diol curative bland. As the percentage of the second diol spreads beyond the above ranges by five percent, the processability relative to the need for postcure or increased cure cycles is affected. Also, the physicals at either high or low temperature may become unsatisfactory for the more severe usages such as facia for automobiles, although they would still be satisfactory for dock bumpers and other related uses and still can be used at relatively high diol cure levels without the skin delaminating.

The diol curatives of this invention can be utilized to produce polyurethanes by the quasi-prepolymer, prepolymer or single shot methods. For illustrative purposes, the diol curative can be reacted with a polyurethane reaction mixture containing a reactive hydrogen containing compound of about 500 to about 7000 molecular weight and preferably 1000 to 6500 and an organic polyisocyanate reactive material with the ratio of the reactive hydrogen compounds, viz. hydroxyl or amino groups to isocyanate groups varying from 90/100 to 110/100 for example, in the quasi-prepolymer and one-shot methods, and diol curative being present in 80 to 105, but preferably 95 to 99 percent based on the excess isocyanate relative to the reactive hydrogen containing compound.

The reactive hydrogen containing compounds useful in this invention are polyester polyols, polyether polyols, polyesteramides and hydrocarbon polyols. The polyester polyols are represented by the condensation product of the polycarboxylic acids or their anhydrides, containing 2 to 30 carbon atoms with the polyols having 2 to 8 hydroxyls and a molecular weight of less than 500 such as the adipates or azelates of the glycols of ethylene, propylene or butylene, or phthalates of the glycols of ethylene, propylene, or hexylene. The polyether polyols are represented by polytetramethylene ether glycol or triol or polypropylene ether glycols or triols. The hydrocarbon polyols are represented by the hydroxyl terminated polymers or copolymers of the $\alpha$-olefins and diolefins containing from 2 to 20 carbon atoms. Representative members of this family are the hydroxyl terminated polybutadienes or its hydroxyl terminated copolymer of butadiene styrene.

The organic polyisocyanates useful in this invention are those of the aliphatic, alicyclic or aromatic type with the aliphatic and alicyclic polyisocyanates being preferred where hydrolysis and discoloration resistance is desired. Representative examples of these classes are toluene diisocyanate, methane di-(phenylisocyanate), hexylene diisocyanate, isophorone diisocyanate and methane di(cyclohexylisocyanate).

The nature of this invention and its advantages can be more readily appreciated from the following representative and illustrative examples where all parts and percentages are by weight unless otherwise indicated.

EXAMPLE I

A premix was formed by blending 84.39 parts of polypropylene ether triol of 6000 molecular weight, 16 parts of a diol curative, 0.007 parts of dibutyltin dilaurate and 0.1 part of triethylene diamine. This premix was then reacted by the one-shot method with 85 parts of the adduct of 4,4-diphenylmethane diisocyanate and tripropylene glycol having 22.5 percent free NCO. Reference to Table 1 will disclose the nature of the diol curative, i.e., the control and the blends used in making the polyurethanes of the control and the blends 1 through 7 and will also disclose that the physical properties of the polyurethane prepared with the diol curative blends to be equivalent with those obtained with the control curative, i.e., 1,4-butanediol. Also, it should be indicated that the parts molded using the diol curative blends 1 through 7 were free of any tendency to delaminate or to have a thin skin such as may be experienced with the 1,4-butanediol curatives.

Table 1

| Diol Curative | Control | Blend 1 | Blend 2 | Blend 3 | Blend 4 | Blend 5 | Blend 6 | Blend 7 |
|---|---|---|---|---|---|---|---|---|
| 1,4-Butanediol, mole % | 100 | — | — | — | — | — | — | — |
| Ethylene glycol, mole % | — | 80 | 75 | 70 | 80 | 75 | 70 | 60 |
| Diethylene glycol, mole % | — | 20 | 25 | 30 | — | — | — | — |
| Diethanol carbamate, mole % | — | — | — | — | 20 | 25 | 30 | 40 |
| Processability | Good | Good | Good | Fair | Good | Good | Fair | Limp |
| Physical Properties | | | | | | | | |
| −30° C. Hammer Imp. ct. | Pass | Fair | Pass | Pass | Pass | Pass | Marginal | Fair |
| 120° C. High Temp Sag (in.) | 1.06 | 1.5 | 2.4 | 3.1 | 1.6 | 1.3 | 2.1 | 2.4 |
| Resilience at 30 sec. | 15 | 16 | 15 | 22 | 20 | 20 | 15 | 18 |

Table 1-continued

| Diol Curative | Control | Blend 1 | Blend 2 | Blend 3 | Blend 4 | Blend 5 | Blend 6 | Blend 7 |
|---|---|---|---|---|---|---|---|---|
| Angle in degrees at 5 min. | 5 | 5 | 5 | 9 | 3 | 10 | 8 | 8 |
| Shore D hardness | 58 | 58 | 58 | 59 | 60 | 60 | 62 | 64 |
| Tensile, psi | 3390 | 3100 | 2950 | 2785 | 3075 | 3280 | 3430 | 3490 |
| 100% Modulus, psi | 2690 | 2690 | 2450 | 2675 | 2940 | 2980 | 2970 | 3125 |
| Elongation, % | 215 | 180 | 176 | 116 | 110 | 200 | 190 | 215 |
| Tear, ppi | 705 | 546 | 597 | 588 | 706 | 728 | 779 | 662 |

All products in Table 1 had specific gravities in the range of 1.08 to 1.10.
The flexible modulus on the blends were as good as or slightly better than those for the control.

EXAMPLE II

Polyurethane shoe soles were made by injecting a liquid polyurethane reaction mixture into a shoe sole mold of unit shoe sole type and allowing the mixture to form and cure before demolding. The physical properties of the polyurethanes made with the diol curative blends of this invention are compared with those of 1,4-butanediol curative in Table 2.

By using blending agents such as water and/or trifluorochloromethane, the physicals can be caused to vary with density as shown in Table 2.

TABLE 2

Table 2

| Recipe | Shoe Soles | | | |
|---|---|---|---|---|
| | Control | Blends | | |
| Polypropylene ether glycol, parts | 90.7 | 90 | 90 | 90 |
| 1,4-Butanediol, parts | 9.3 | 0 | 0 | 0 |
| Ethylene glycol, parts | 0 | 5.7 | 5.7 | 5.7 |
| Diethanol carbamate, parts | 0 | 5.6 | 5.6 | 5.6 |
| Water, parts | 0 | 0 | ** | 0 |
| Trifluorochloromethane, parts | 0 | 0 | — | ** |
| Mondur-PF* | 45.7 | 55.1 | 61.5 | 55.1 |
| Specific gravity | 1.089 | 0.95 | 0.92 | 0.55 |
| Shore hardness, A | 81 | 80 | 82 | 56 |
| Tensile, Kg/Cm$^2$ | 84.2 | 109.5 | 114.5 | 34.1 |
| Elongation, % | 435 | 500 | 310 | 300 |
| Crescent tear, Kg/Cm | 84.2 | 47.3 | 45.7 | 18.6 |
| Ross Flex, cycles to failure | 2.6 at 250,000 | 1 at 250,000 | 10 at 148,000 | 1 at 250,000 |

*Trade designation of isocyanate of Mobay Chemical Co. having approximately 22 % NCO.
**Sufficient blowing agent to give specific gravity shown.

Although representative recipes have been given in the above examples, it should be appreciated that any of the other polyether polyols, polyester polyols or hydrocarbon polyols could be used instead of polypropylene ether glycol with the diol curative blends of this invention. Likewise, any of the organic polyisocyanates can be used in place of the quasi-prepolymers listed without experiencing delamination of the skin experienced with 1,4-butane-diol cures and the resulting physical properties will be essentially equivalent to those obtained with 1,4-butane-diol cures.

While certain representative embodiments and details have been shown for the purpose of illustrating the invention, it will be apparent to those skilled in this art that various changes and modifications may be made therein without departing from the spirit or scope of the invention.

What is claimed is:

1. A polyol curative satisfactory for curing polyurethane reaction mixtures, said curative comprising ethylene glycol and a second diol selected from the class consisting of thio diethylene and the carbamates of diethanol, ethanol isopropanol and ethanol diethanol.

2. The polyol curative of claim 1 wherein the second diol is diethanol carbamate and is present in from about 10 to 35 mole percent of the total curative.

* * * * *